United States Patent [19]

Enbutsu et al.

[11] Patent Number: 5,465,320

[45] Date of Patent: Nov. 7, 1995

[54] METHOD OF AUTOMATED LEARNING, AN APPARATUS THEREFOR, AND A SYSTEM INCORPORATING SUCH AN APPARATUS

[75] Inventors: Ichiro Enbutsu; Kenzi Baba; Naoki Hara, all of Hitachi; Mikio Yoda, Tokai; Shoji Watanabe; Hayao Yahagi, both of Hitachi, all of Japan

[73] Assignee: Hitachi, Ltd., Tokyo, Japan

[21] Appl. No.: 907,539

[22] Filed: Jul. 2, 1992

[30] Foreign Application Priority Data

Jul. 4, 1991 [JP] Japan ................................ 3-164212

[51] Int. Cl.$^6$ ........................................ G06F 9/00
[52] U.S. Cl. .................................... 395/22; 395/77
[58] Field of Search ............................. 395/11, 22, 23, 395/51, 61, 77

[56] References Cited

U.S. PATENT DOCUMENTS

| | | | |
|---|---|---|---|
| 4,803,642 | 2/1988 | Muranoga | 395/61 |
| 5,046,019 | 9/1991 | Basehore | 395/11 |
| 5,168,549 | 12/1992 | Takagi et al. | 395/3 |
| 5,175,801 | 12/1992 | Iokibe | 395/61 |

FOREIGN PATENT DOCUMENTS

| | | | |
|---|---|---|---|
| 0432267 | 3/1990 | European Pat. Off. | G05B 13/02 |
| 0471857 | 12/1991 | European Pat. Off. | G06F 9/44 |

OTHER PUBLICATIONS

Furuta et al, "A Fuzzy Expert System for Durability Assessment of Bridge Decks", Proc 1st Int'l Symposium on Uncertainty Modeling & Analysis, Dec. 3-5 1990, pp. 522-527.

Hayashi et al, "Fuzzy Neura Expert System with Automated Extraction of Fuzzy If-Then Rules from a Trained Neura Network", Proc 1st Int'l Symposium on Uncertainty Model & Analysis, Dec. 3-5 1990, pp. 489-494.

Tzeng et al, "Maintaining Consistency in a Rule Based Expert System", TENCON '89. 4th IEEE Region 10 Int'l Conf. Info Tech. for 90's Energy, Electronics, Computers, Nov. 22-24 1989, pp. 63-66.

Baba et al, "Explicit Representation of Knowledge Acquired from Plant Historical, Data Using Neural Network", IJCNN Jun. 17-21, 1990, pp. 155-160.

Takagi et al, "Artificial Neural Network Driven Fuzzy Reasoning", Int'l Workshop on Fuzzy System Applications, Aug. 20-24, 1988, pp. 217-218.

Hayashi et al, "Neural Network Driven Fuzzy Reasoning-"Proc 28th SICE Annual Conf. Jul. '89, pp. 1343-1346.

Hayashi et al, "Fuzzy Neural Expert System with Automated Extraction of Fuzzy If-Then Rules from a Trained Neural Network", Proc of 1st Int'l Sym on Uncertainty Modelling Analysis, Dec. 3-5 1990, pp. 489-494.

Ultsch et al, "Conkat: A Connectionist Knowledge Acquisition Tool", Proc 24th Annual Hawaii Int'l Conf. on Sys Sciences, Jan 8-11 1991, pp. 507-513 vol. 10.

*Proceedings of the IEEE*, vol. 78, No. 9, Sep. 1990, "Networks for Approximation and Learning", by T. Poggio, et al.

*Patent Abstracts of Japan*, Unexamined applications, P.

(List continued on next page.)

*Primary Examiner*—Robert W. Downs
*Attorney, Agent, or Firm*—Antonelli, Terry, Stout & Kraus

[57] ABSTRACT

In order to speed up and simplify automated learning of rules by a neural network making use of fuzzy logic, data from a system is analyzed by a teaching data creation means which groups the data into clusters and then selects a representative data item from each group for subsequent analysis. The selected data items are passed to a rule extraction means which investigates relationships between the data items, to derive rules, but eliminates rules which have only an insignificant effect on the system. The results are candidate rules which are stored in a first rule base. The candidate rules are then compared with rules in a second rule base to check for duplication and/or contradiction. Only those rules which are not duplicated and not contradictory are stored in the second rule base. Hence, when fuzzy inference is used to control the system on the basis of rules in the second rule base, only valid rules which provide a significant effect on the system are used.

1 Claim, 7 Drawing Sheets

OTHER PUBLICATIONS field, vol. 14, No. 547, Dec. 5, 1990, No. 2-231 670, (Sharp).

*Patent Abstracts of Japan*, Unexamined applications, P field, vol. 15, No. 136, Apr. 4, 1991, No. 3-15 902 (Hitachi).

*Patent Abstracts of Japan*, Unexamined applications, P field, vol. 15, No. 71, Feb. 19, 1991, 2-292 602, (NKK Corporation).

*Patent Abstracts of Japan*, Unexamined applications, P. Field, vol. 15, No. 278, Jul. 15, 1991.

Nature, vol. 323 (1986) pp. 533 to 536 David E. Rumelhart et al.

"Learning representations by back-propagating errors".

Journal of Electricity D, vol. III No. 1 pp. 20 to 28, "Study on Extraction of Plat Operation Rules using Newral Network" Ichiro Enbutsu et al., (1991).

METHOD OF AUTOMATED LEARNING, AN APPARATUS THEREFOR, AND A SYSTEM INCORPORATING SUCH AN APPARATUS

BACKGROUND OF THE INVENTION

1. Field of the Invention

The present invention relates to automated learning of rules corresponding to the inter-relationship of data items. It is particularly, but not exclusively, applicable to learning within a neural network of a fuzzy logic system. The present invention also relates to an apparatus for such automated learning, and to a system of devices controlled according to rules, at least some of which are derived automatically by such an apparatus.

2. Summary of the Prior Art

There are many processes in which a phenomenon which varies with time is controlled by monitoring parameters of the process and controlling devices which affect those parameters. An example of such a process is water purification, but similar considerations apply to thermal, nuclear and hydraulic power generation processes, chemical processes, biological processes and even bank management information processes.

If the control of such a process is to be automated, it is necessary to define causal relationships between the variables describing the process. Traditionally, such control has therefore depended on the experience of skilled operators, but consideration has been given to the use of fuzzy logic systems which enable causal relationships to be expressed in terms which may be used by computers. Initially, the rules used by such fuzzy logic systems were established on the basis of the knowledge of skilled operators, but the use of neural networks enabled the fuzzy logic system to learn rules on the basis of the previous behavior of the system to be controlled.

Thus, EP-A-0432267 disclosed a neural network which learned (ie. derived) rules from historical data of a system such as a water purification plant. In such a system, the inter-relationships between input and output parameters were investigated and the rules of such inter-relationship determined. In this way it was possible to add to those rules established on the basis of the knowledge of a skilled operator additional rules which were implicit in the historical data derived from the operation of the system.

It has been found, however, that the practical implementation of such automated learning (automated derivation of rules) is not satisfactory. In a simple system, such as the control of an elevator or the control of a subway, the number of parameters is limited, and therefore the neural network can derive the appropriate rules within a relatively short time. However, if the process to be controlled is more complex, such as in a water purification plant or in a chemical plant, the number of relationships to be investigated increases significantly, and there are significant delays in the derivation of the appropriate rules. Hence, the application of neural networks to complex systems has proved impractical.

SUMMARY OF THE INVENTION

The present invention addresses the question of excessive amounts of data inter-relationships to be investigated, and considers three areas in which the known neural network arrangements may be improved. These three areas will be discussed below, as aspects of the present invention.

The first aspect of the present invention relates to the data used in the automated learning operation. For a complex system for which historical data is available relating to the operation thereof, it is not normally practical for the automated learning process to be applied to each and every data item, as the time needed to investigate the relationships using a neural network could then be excessively large. It would be possible to collect appropriate data on the basis of the experience of an operator, or on the basis of trial and error, but this would not permit automated learning. It has been appreciated that data items from such a system may be divided into groups (clusters) with the data items in each group being similar (having a predetermined relationship therebetween). Then, a typical or representative data item is selected from each of the plurality of groups, eg. by an averaging process, and only the selected dated items are then analyzed. This idea of clustering the data items, and analyzing collected data items from the clusters is thus the first aspect of the present invention.

It is possible to analyze only a single data item from each cluster, or to analyze a plurality of data items representative of the cluster. However, the aim of this aspect is to reduce the number of data items to be investigated relative to the plurality of data items available.

In practice, pairs of data items are considered, and the separation of the data items, in the data item parameter space, is determined. Then, if the separation is less than a given threshold, the pair of data items can be considered to belong to a common cluster. If, on the other hand, the separation is greater than the threshold, they may be considered to lie in different clusters.

In this way, data creation for the learning process may be automated. The data thus created may be referred to as 'teaching' data because it is then used by the learning process.

Having obtained data items, the next step is to determine the relationships therebetween. This enables rules for the operation of a system which the data items are derived to be obtained. However, the number of rules increases in dependence on the number of data items and thus there are, in principle, a very large number of possible rules. Thus, the reduction of the data achieved by clustering and selection, according to the first aspect, may not be sufficient to enable the rules to be obtained within a suitable time. Furthermore, if there are many rules to be applied in a given situation, the speed of response may be slowed.

However, it has further been realized that many of the rules thus derived are effectively redundant, because some of the rules have only an insignificant effect on the behavior of the system from which the data items are derived. Thus, the derivation of such rules for controlling the system is pointless.

To achieve learning according to the second aspect of the present invention, it would be possible to derive all the rules, and then eliminate the insignificant rules, ie. those rules for which the effect on the system is less than a predetermined threshold. However, although this would reduce the number of rules to be applied in the control operation and so speed up the response, it would still require a significant time to derive the rules, and therefore it is preferable to analyze the data items themselves to determine the effect of output values on the system, corresponding to different input values. Then, those input and output values (data items) for which the effect is significant, (ie. have a predetermined relationship with a threshold value) are selected. The relationships between the selected input and output values are then derived. This permits the rules to be learned rapidly.

With this second aspect of the present invention, which makes use of a threshold value, there are several ways in which that threshold value may be applied. The simplest is to consider the absolute value of the effect of the output values on the system and to select those output values, and corresponding input values, for which the absolute value of the effect is greater than the predetermined threshold. However, in such an arrangement it is difficult to set in advance the level of the threshold. Therefore, it is preferable to normalize the absolute values for each output value, corresponding to different input values, so that the normalized values give a ready comparison of the relative effects on the system. Within such a normalized arrangement, the total of the effect of a given output value, for all the possible input values of that output value, is always 100%. Therefore, if the effect of the output value, for a given input value, is very small, it may readily be seen as insignificant and thus it is possible to set in advance a suitable threshold value. For example, if the normalized value is less than 5%, and the number of input values of the input value is small, then it may be determined that the particular combination of input and output values corresponding to that normalized value is insignificant and may thus be ignored.

Once significant input and output values have been obtained, the inter-relationships may be investigated, to derive appropriate rules.

In existing neural networks, it is assumed that, once a rule has been derived, it is necessary to make use of that rule. However, this does not take into account the possibility that rules may be duplicated or be contradictory. Therefore, a third aspect of the present invention proposes that previously derived rules are compared, to enable the elimination of duplicated and/or inconsistent rules. In the latter case, the simplest arrangement is for inconsistent rules to be detected, and displayed so that a skilled operator may select between the inconsistent rules.

Thus, the three aspects of the present invention discussed above permit more rapid and more efficient derivation of rules within a neural network for controlling a system. Each of the three aspects offers an improvement in performance, and therefore each may be used independently. However, it is possible to use these aspects in any combination.

The present invention can be applied to the control of any process which exceeds a phenomenon which changes with time, such as water purification processes, river information processes, weather information processes, power generation processes (eg. thermal, hydraulic or atomic power) heat and power supply processes, chemical processes, biological processes, and even banking and financial processes. It may further be seen that although the present invention has particular applicability in fuzzy logic, for deriving fuzzy rules, it will also permit the derivation of absolute (crisp) rules. Because the present invention permits more automated learning than previously known arrangements, the burden imposed on the operator is reduced. Furthermore, the process for checking the rules derived by the neural network may be simplified, to ensure the validity of the rule base.

BRIEF DESCRIPTION OF THE DRAWINGS

An embodiment of the present invention will now be described in detail, by way of example, with reference to the accompanying drawings, in which.

DETAILED DESCRIPTION

Figure 1:
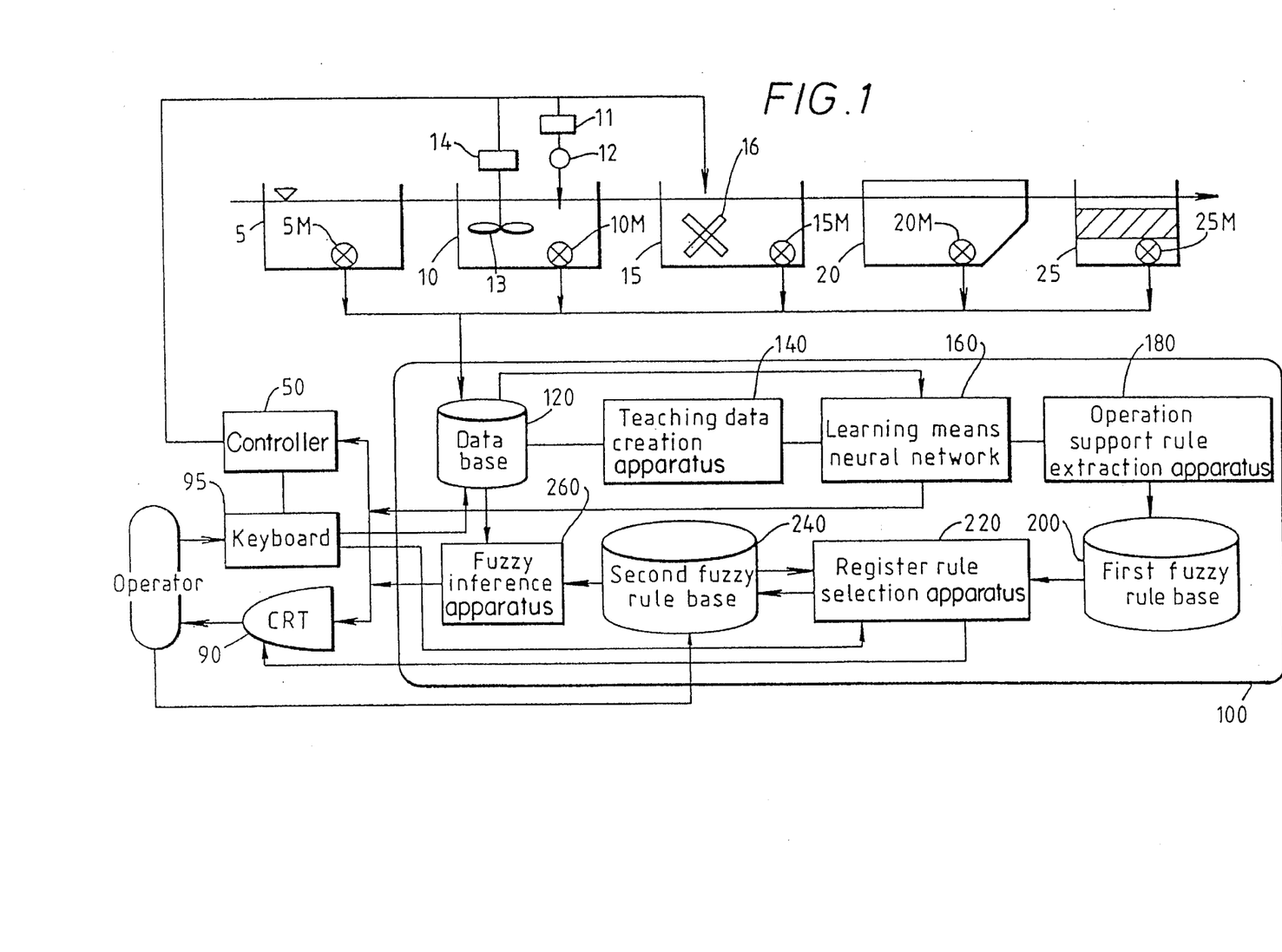
FIG. 1 is a schematic block diagram showing a water purification plant incorporating a system according to the present invention for learning rules.

FIG. 1 is a block diagram showing the structure of a water purification process operation management support system which includes a neural network operating according to the principles of the present invention, and is thus an embodiment of the present invention.

Firstly, the steps of the water purification process will be explained. In FIG. 1, untreated water is introduced into a water bath 5 from a river, lake, or marsh. A flash mixer 10 receives water from the water bath 5, a coagulant is supplied from a tank 11 by a pouring pump 12, and an agitating element 13 is driven by an agitator motor 14. An alkaline agent may be added so as to promote floc formation. There is an agitating paddle 16 in a floc formation tank 15, which rotates slowly. Flocs settle in a sedimentation tank 20 and the supernatant liquid is filtered by a filtration tank 25.

Next, the measuring instruments of the system will be discussed. There is measuring instrument 5M in the water bath 5 which measures the quality of the untreated water. Measurement parameters include water temperature, turbidity, alkalinity, pH, electric conductivity, residual chlorine concentration, chlorine demand, water volume, and water level. There is a further measuring instrument 15M in the floc formation tank 15. The measuring instrument 15M includes a photographic means such as an underwater camera in addition to means for measuring the same measurement parameters as the measuring instrument 5M. A further measuring instrument 20M is installed in the sedimentation tank 20.

A measuring instrument 10M or 25M which is similar to the measuring instrument 5M or 15M can be installed in the flash mixer 10 or the filter tank 25 when necessary. Their measurement parameters are the same as those of the measuring instrument 5M or 15M. Measured data is read into a data base 120 of a computer system 100.

Next, the computer system 100, which is a neural network process operation support system (hereinafter called "support system") will be discussed. The support system 100 is normally embodied in a work station which is different from the control computer of the purification process.

The support system 100 comprises a data base 120, a teaching data creation means 140, a learning means being a neural network module 160, an operation support rule acquisition means 180, a first fuzzy rule base 200, a register rule selection means 220, a second fuzzy rule base 240, and a fuzzy inference means 260.

Data corresponding to typical operation conditions are selected from historical data of many processes saved in the data base 120 by the teaching data creation means 140 so as to create teaching data. The selected teaching data is analyzed by the neural network module 160. The analysis operation is performed by algorithms for correcting the weighting factors between the neurons of the neural network. The details of this will be discussed later.

The neural network module 160 can output guidance for the operation on the basis of the result of a learning operation. The operation support rule acquisition means 180 extracts fuzzy rules by evaluating the causal relationships between the input and output factors, making use of weighting factors obtained by the learning operation of the neural network module 160. An evaluation scale is used for the evaluation of the causal relationship. This will be described in more in detail later.

The extracted fuzzy rules are saved in a first fuzzy rule base 200. The fuzzy rules saved in the first fuzzy rule base 200 are compared with the rules derived on the basis of the experience of the operator, which are saved in a second fuzzy rule base 240. This comparison is carried out by the register rule selection means 220 and rules are transferred to the second fuzzy rule base 240 after a check has been made to avoid duplication and contradiction within the fuzzy rules. The second fuzzy rule base 240 is used for inference by the fuzzy inference means 260, and the operation value guidance is output to a display unit (CRT) 90 as an inference result.

Input and output to the support system 100 will now be discussed.

Firstly, for input, the measuring instruments 5M, 10M, 20M, and 25M, sample data at fixed time intervals. The sampled data is sent to the data base 120 and saved. Data obtained by manual analysis data or by visual observation, which cannot be measured online by a measuring instrument, is processed interactively from a keyboard 95 with reference to the display unit 90 and used by the neural network for the learning operation.

For output, the support system 100 determines the contents to be guided on the basis of the input data. The operation guidance obtained from the neural network module 160 and the fuzzy inference means 260 in the support system 100 is displayed on the display unit for use by the operator.

The operator refers to the guidance given by the display unit 90 and inputs changes of operation values which are considered to be necessary for a control means 50, via the keyboard 95. The control means 50 controls each device of the process according to the input data. The guidance from the support system 100 can be directly input to the control means 50 by changing the operation mode so as to provide automatic operation.

Next, the details of the teaching data creation means 140, the operation support rule extraction means 180, and the register rule selection means 220 which are used in this embodiment of the present invention will be discussed in more detail.

Figure 2:
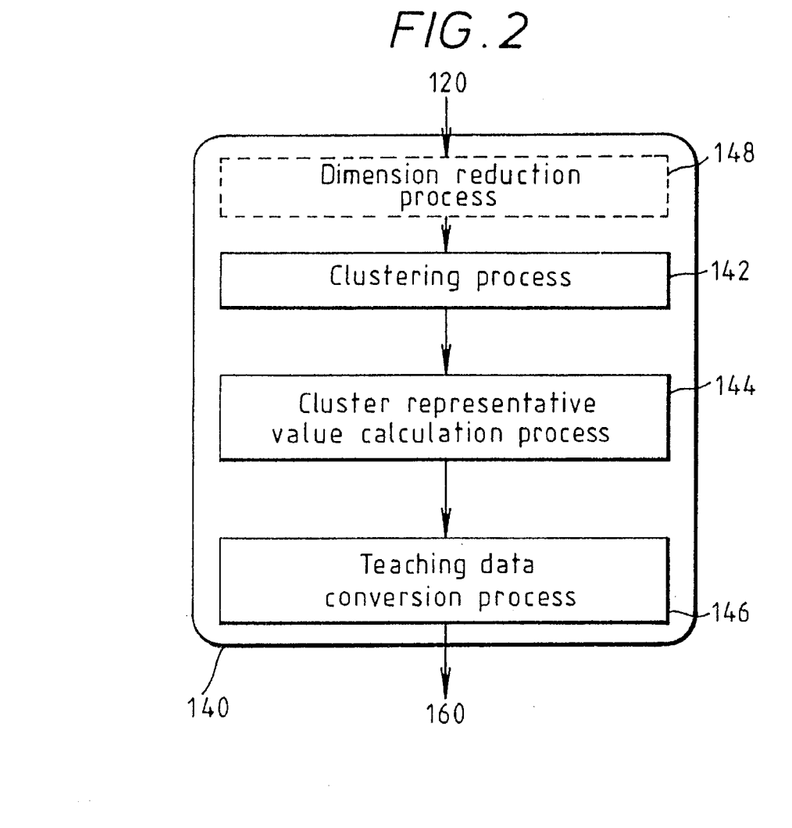
FIG. 2 is a flow chart showing the operation of the teaching data creation means of FIG. 1.

FIG. 2 is a flow chart showing the operation of the teaching data creation means 140. In a clustering process 142, many historical data of the data base 120 are clustered (grouped) so as to classify the data into several clusters (groups of data patterns having similar characteristics). In this case, the cluster dimension is the number of data items of process status value which affects the process operation value.

The clustering process 142 involves the measurement of the separation of the values of pairs of historical data in the data base 120, and comparison of those separations with a predetermined threshold value. If the separations are less than that predetermined threshold value, the pairs of data items are considered to be in the same cluster. Thus, the historical data are divided into clusters within which data items are relatively close together (pairs have separations less than the threshold value). The data items of separate clusters will be separated by more than the threshold value.

As seen in FIG. 2, since clustering to increase the cluster dimension is difficult, a dimension reduction process 148 for limiting the process status value to the necessary minimum number of items by preliminary analysis of the data may be added prior to the clustering process 142. Such clustering can be performed by using the technique described in, for example, the article entitled "Hierarchical Cluster Analytical Method on the Basis of a Single Model" (published in the SICE Kansai Branch Symposium Text, pp. 21 to 24, 1986).

A cluster representative value calculation process 144 calculates combinations of data representing the clusters obtained by the clustering operation discussed above. The representative value may be the mean value of the data patterns of a cluster. For example, the mean value of a three-dimensional cluster n having two data items can be obtained as shown by Equation 1.

Component of cluster $n$: $(x_1^1, x_2^1, x_3^1)$, $(x_1^2, x_2^2, x_3^2)$ (Equation 1)

Representative value of cluster $n$: $((x_1^1 + x_1^2) \div 2, (x_2^1 + x_2^2) \div 2, (x_3^1 + x_3^2) \div 2)$ A teaching data conversion process 146 converts the representative value of each cluster calculated by the cluster representative value calculation process 144 to a value with a format such that it can be learned by the neural network. Since each data item is often outside a range from 0 to 1, which is desirable for input and output to the neural network, each data item is normalized so that its value is within the range 0 to 1. This is achieved by linear conversion, by conversion with a sigmoid function, or by logarithmic conversion. Furthermore, the data items are divided into data corresponding to inputs of the network and data corresponding to outputs.

In the above discussion, it has been assumed that a single representative value is obtained for each cluster. In fact, this is not essential and it is possible to obtain a plurality of representative values. Thus, rather than obtaining a representative value by averaging among the actual values, it is possible to select those representative values which are sufficiently close to the mean of the cluster. Indeed, any method may be used which reduces the number of data items from the total number in a cluster to a more limited selection. In this way, the amount of data items which need to be investigated, to determine the relationships therebetween, is limited and the amount of time needed to determine the inter-relationships is thereby reduced.

Next, the neural network module 160 will be discussed and then the operation support rule extraction means 180 will be explained.

The basis of the model used by the module 160 corresponds to neurons forming the human brain. Mathematical models of individual neurons using the physiological knowledge of neurons are widely used. The basic operation of such neurons is represented by functions having threshold characteristics of the input-output system shown by Equations 2, 3, and 4.

$$u_{2j} = \sum_i w_{2j,1i} \cdot x_{1i} \quad \text{(Equation 3)}$$

A signal to a neuron which is connected to another neuron is multiplied by a weighting factor $w_{2j,1i}$ according to the connection strength (weighting factor, synapse strength) between the two. The neuron sends an output signal $y_{2j}$ according to the total sum $u_{2j}$ of these weighted input signals $w_{2j,1i}$. The threshold value θ of Equation 4 then determines the threshold characteristics. The sigmoid function of Equation 4 is used as a function for converting input to output. However, a function corresponding to linear conversion or logarithmic conversion may be used.

Figure 3:
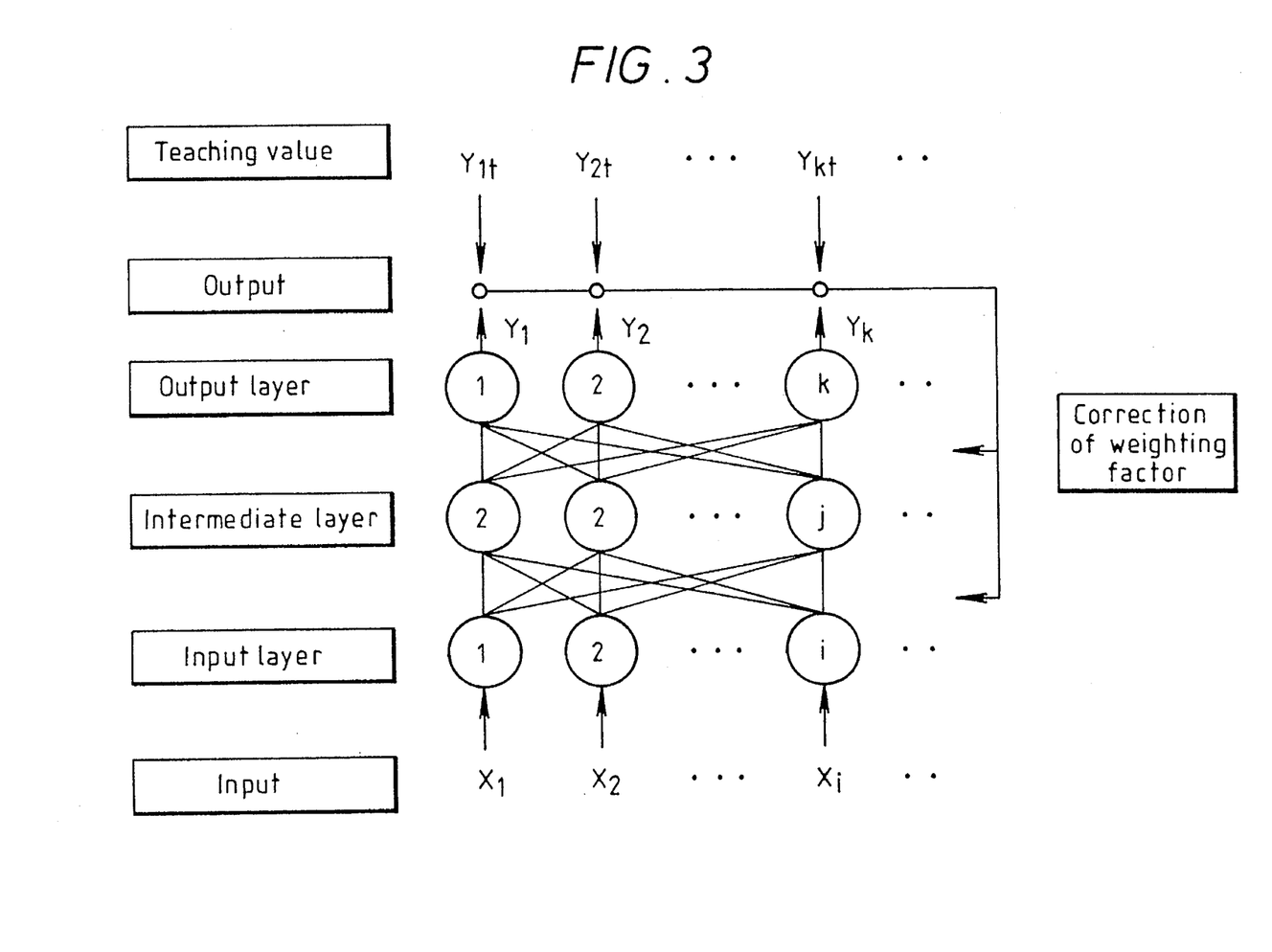
FIG. 3 is a schematic view of an example of a hierarchical neural network which may be used in the present invention.
Figure 4:
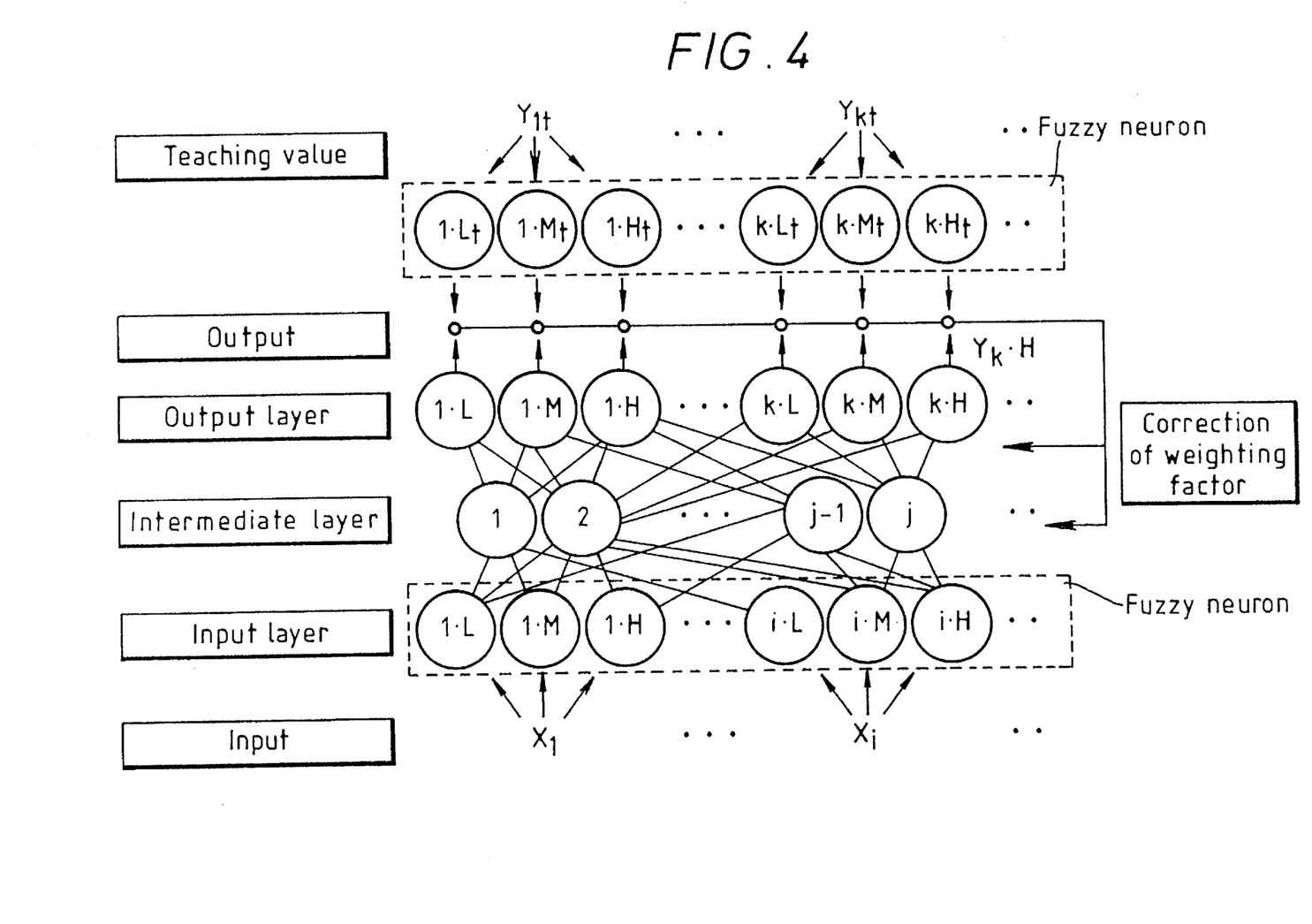
FIG. 4 is a schematic view of another example of the structure of a hierarchical neural network which may be used in the present invention.

The neural network model is a network type model comprising the above neurons as basic components. Although a plurality of models are proposed, the present embodiment uses a hierarchical (multilayered) model (also known as a Rumelhart model) wherein neurons are combined hierarchically. This model has a three-layer structure comprising an input layer, an intermediate layer, and an output layer as shown in FIG. 3. It is desirable that a network structure is used in which fuzzy variables such as "high", "medium", and "low" (abbreviated to H, M, and L) are assigned as the inputs of the input layer and the outputs of the output layer, as shown in FIG. 4. In a network of this structure, each input, output, and teaching value corresponds to three neurons. For fuzzy neurons, a value input to a neuron is converted to a membership value by a membership function determined by fuzzy logic.

The neural network model learns by correcting the weighting factor matrix so that the association errors are reduced. In the method known as the BP method (the details of the algorithm of which are described by Rumelhart, D.E., et al. in the article entitled "Learning Representations by Backpropagating Errors", in Nature, Vol. 323, (1986) pp. 533 to 536) the square sum of association errors is defined as an evaluation function and the weighting factor matrix is corrected so that the evaluation function decreases.

The neural network learns the appropriate rules and outputs suitable guidance instructions from the output layer by inputting data from the data base 120 into the input layer and may also display those instructions on the display unit (CRT) 90.

Figure 5:
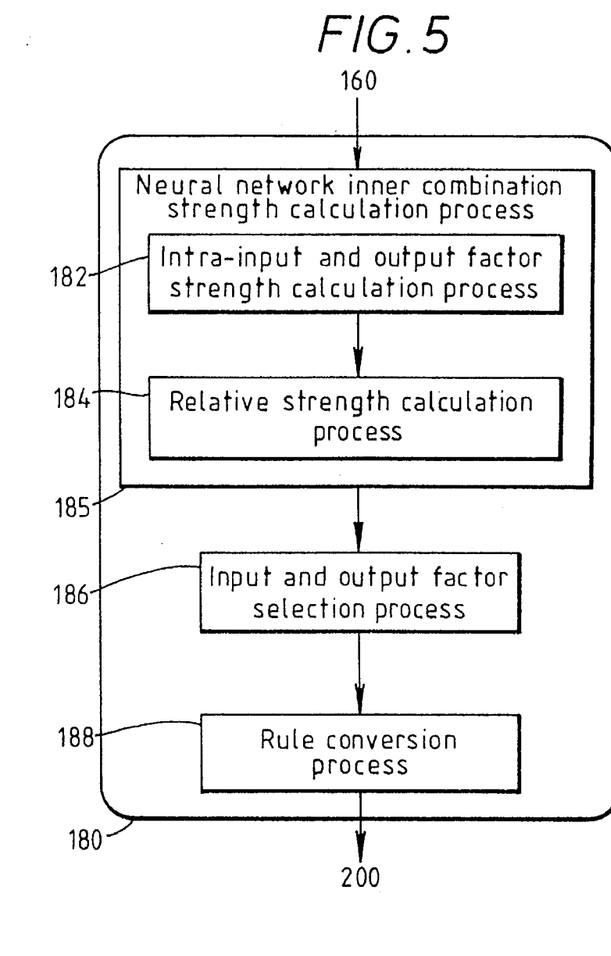
FIG. 5 is a flow diagram illustrating the operation of the operation support rule instruction means of FIG. 1.

On the basis of the weighting factors $w_{2j,1i}$ and $w_{3k,2j}$ (weighting factor between the neurons 3k and 2j) obtained by the neural network module 160, the operation support rule extraction means 180 evaluates the causal relationship between the input and output factors of the neural network. FIG. 5 shows a flow chart of the functions carried out by the operation support rule extraction means 180. The operation support rule extraction means 180 comprises a neural network inner combination strength calculation process 185, an input and output factor selection process 186, and a rule conversion process 188. The neural network inner combination strength calculation process 185 comprises an input and output factor absolute strength calculation process 182 and a relative strength calculation process 184.

The input and output factor absolute strength calculation process 182 calculates the "causal relationship scale" which is a scale for evaluating the causal relationship between input and output. The definition of the causal relationship scale is shown by Equations 5 and 6. For further details, refer to Japanese Patent Application Laid-Open No. 3-15902 and the article entitled "Study on Extraction of Plant Operation Rules using Neural Network" in the Journal of Electricity D, Vol. 111, No. 1, p. 18.

$$C_{3k,1i} \equiv \sum_j f'(u_{3k}) \cdot f'(u_{2j}) \cdot w_{3k,2j} \cdot w_{2j,1i} \quad \text{(Equation 5)}$$

$$C_{3k,1i} \equiv \sum_j w_{3k,2j} \cdot w_{2j,1i} \quad \text{(Equation 6)}$$

Where, $u_{2j}$: Product sum of input to the neuron 2j:

$u_{3k}$: Product sum of input to the neuron 3k

$w_{2j,1i}$: Weighting factor between the neurons 2j and 1i

$w_{3k,2j}$: Weighting factor between the neurons 3k and 2j

$x_{1i}$: Input signal from the neuron 1i f': Derived function of the sigmoid function

Equation 5 or 6 is defined as a causal relationship scale $C_{3k,1i}$ for evaluating the causal relationship between an input layer neuron 1i and an output layer neuron 3k. The definition of Equation 5 is more frequently used. When evaluation based on linear approximation is satisfactory, however, the definition of Equation 6 may be used and has the advantage of simplicity. The strength of the causal relationship between the neurons 1i and 3k can be known by the magnitude of the absolute value of $C_{3k,1i}$, and the polarity can be known from whether the signal is positive or negative.

However, the occupation rate of the causal relationship between an input and an output for the causal relationship between all the inputs and outputs cannot be known only by values of the causal relationship scale. Therefore, the next relative strength calculation process 184 calculates the "relative causal index" which can evaluate the causal relationship scale in relative terms. The relative causal relationship scales for the output layer neurons and the input layer neurons are defined by Equations 7 and 8.

$$RC_{3k}(\%) = \left( \sum_i |C_{3k,1i}| \div \sum_k \sum_i |C_{3k,1i}| \right) \times 100 \quad \text{(Equation 7)}$$

$$RC_{3k,1i}(\%) = \left( C_{3k,1i} \div \sum_i |C_{3k,1i}| \right) \times 100 \quad \text{(Equation 8)}$$

The total of the relative causal relationship scales of the output layer neurons or the input layer neurons is 100%. The absolute value and sign indicate positive or negative related to the strength of the causal relationship in the same way as the causal relationship scale.

As was mentioned previously, the purpose of deriving the input and output factor strength is to establish a threshold against which the factors are compared so that only the most significant identified factor is selected for subsequent use. If the absolute strength is used or obtained by the causal relationships scale of Equations 5 or 6, it is very difficult to set that threshold. However, by obtaining the relative causal relationships scales, it is much easier to set a threshold, based on the relative effect of differing inputs on a given output derived. Thus, inputs which have a relative causal index for a given output of 5% or more may be considered significant, and that those inputs for which the relative causal index is less than 5% may be considered insignificant and ignored.

If the absolute strength is used, one possible method for establishing the threshold is to set a threshold number and select those inputs for a given output which have the largest absolute value, until the threshold number of inputs have been selected, with other inputs being ignored. In this way, for example, if the threshold number is set at 10, the ten most significant inputs for a given output are selected, and the other inputs may then be ignored as being insignificant. This latter arrangement is of particular value where some of the inputs have a significantly greater effect than others; it is clearly undesirable where there are a large number of inputs with substantially similar effects.

For the embodiment shown in the Figures, this selection will now be described in more detail.

The input and output factor selection process 186 selects the output layer neurons or the input layer neurons on the basis of a predetermined threshold value of the relative causal relationship scale. Firstly, a neuron which has a strong causal relationship for all given inputs is selected from the output layer neurons as eg. $RC_{3k}$. Next, an input layer neuron which has a strong causal relationship for the selected output layer neuron is selected as eg. $RC_{3k.1i}$. By doing this, only those causal relationships which are determined to be significant by the process operator can be selected. As an alternative to the method for setting the threshold value of the relative causal relationship scale as a selection standard as mentioned above, a method for setting the number of choices starting with the largest absolute value of the absolute or relative causal relationship scale can be used as mentioned above.

The rule conversion process 188 converts to fuzzy rules only those input and output factors selected by the input and output factor selection process 186. For example, when the output layer neuron 3k corresponds to "increase the coagulant" and the input layer neuron 1i corresponds to "the water temperature is high" and the sign of $RC_{3k.1i}$ is positive (negative), Equation 9 can be obtained.

When the water temperature is high, increase (decrease) the coagulent. . . . (Equation 9)

The fuzzy rule obtained here is sent to the first fuzzy rule base 200. This fuzzy rule base 200 stores candidate fuzzy rules to be used for fuzzy inference.

Figure 6:
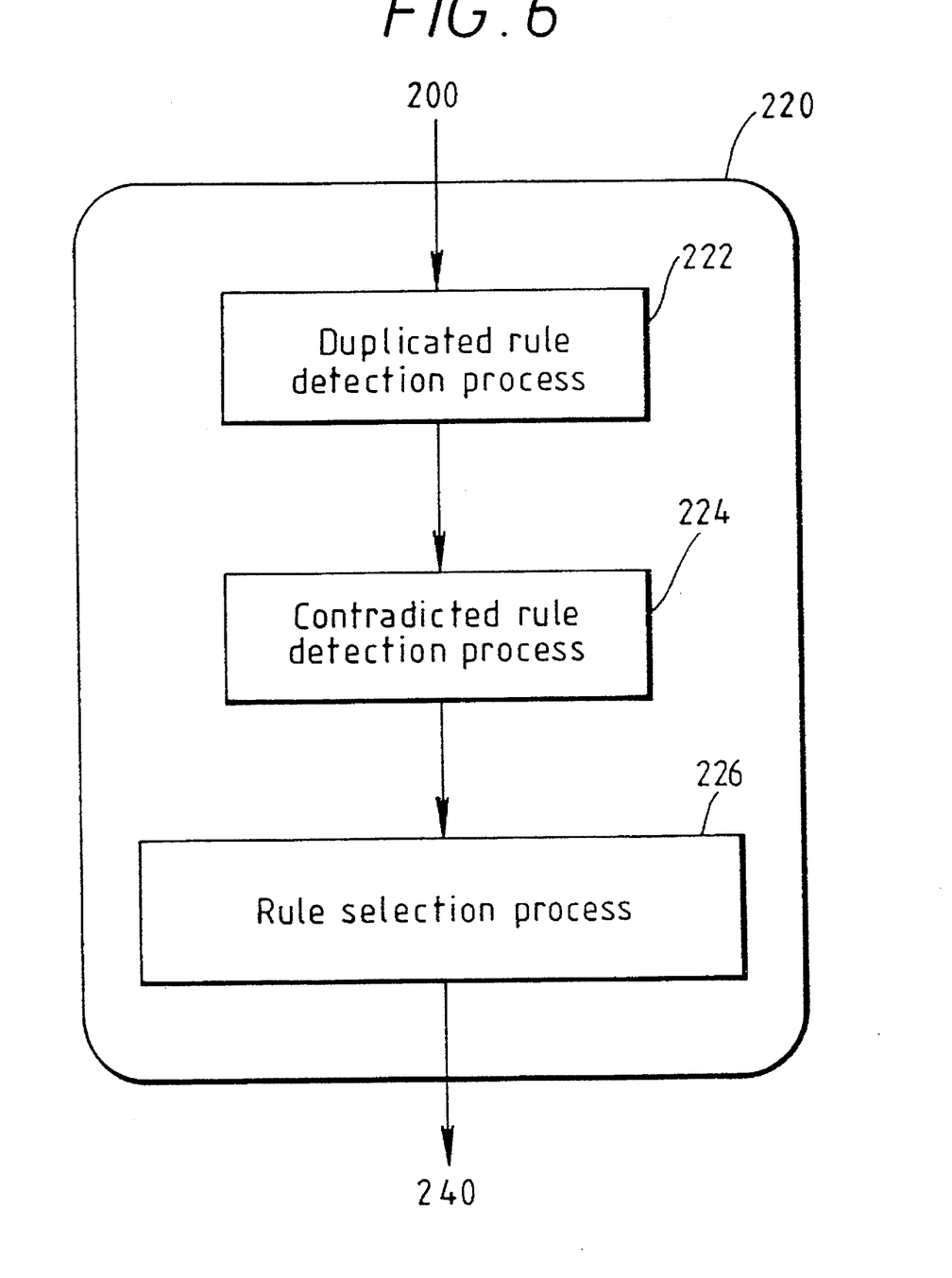
FIG. 6 is a flow diagram showing the operation of the register rule selection means of FIG. 1.
Figure 7:
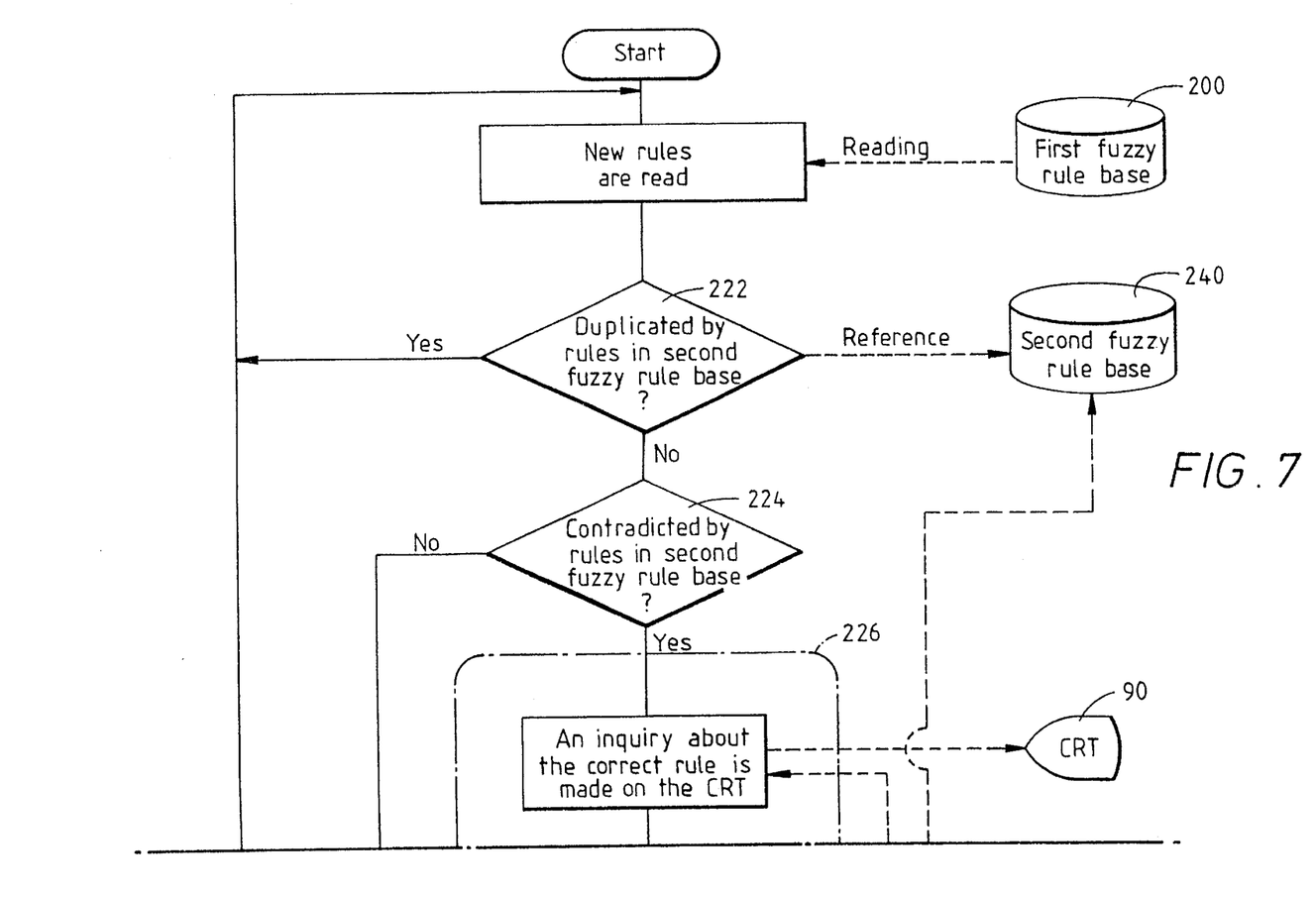
FIG. 7 is a logic diagram of the operation of the register rule selection means of FIG. 1.

Next, the register rule selection means 220 will be discussed. This selection means 220 operates as illustrated in FIGS. 6 and 7. A duplicated rule detection process 222 compares a candidate fuzzy rule from the first fuzzy rule base 200 with rules already in the second fuzzy rule base 240 and detects duplicated fuzzy rules. The second fuzzy rule base 240 stores rules established from the experience of the operator and fuzzy rules from the first fuzzy rule base 200 which have previously been selected as suitable. The duplication detection process 222 first searches for fuzzy rules for which the condition clauses coincide and then checks whether those fuzzy rules, for which the condition clauses coincide, also coincide in respect of the then checks whether those fuzzy rules, for which the conclusion clause. When fuzzy rules which coincide in respect of both the condition and conclusion clauses are found, they are assumed to be duplicates. Duplicated fuzzy rules are erased from the first fuzzy rule base 200 and the corresponding rules in the second fuzzy rule base 240 are left unchanged.

The contradicted rule detection process 224 first searches for fuzzy rules for which the condition clauses coincide and then checks whether those fuzzy rules, for which the condition clauses coincide, have condition clauses which coincide. When the conclusion clauses do not coincide, the rules are assumed to be contradictory.

A rule selection process 226 displays on the display unit 90 those fuzzy rules which are determined as contradictory by the contradicted rule detection process 224. Those fuzzy rules from the first fuzzy rule base 200 which are decided by the operator to be unsuitable for the second fuzzy rule base 240 are not registered in the second fuzzy rule base 240. Those fuzzy rules which are already registered in the second fuzzy rule base 280, but are determined by the operator to be unsuitable, are discarded. By doing this, the validity (soundness) of the second fuzzy rule base 240 is maintained, so that only those fuzzy rules which are determined by the operator to be correct are registered.

By using the teaching data creation means 140, the operation support rule extraction means 180, and the register rule selection means 220 which are characteristics of this embodiment of the present invention as described above, the processes of acquisition and correction of fuzzy rules of the fuzzy rule base, which are conventionally performed manually, are effectively supported and the labor of operators and system constructors can be reduced substantially.

The fuzzy inference means 260 infers fuzzy rules by using the second fuzzy rule base 240 and the data base 120 and displays the process operation value, for example, a quantitative guidance for the coagulant pouring pump 12 and the agitating element 13 on the display unit 90. In this fuzzy inference, not only the rules derived from the experience of the operator but also knowledge (fuzzy rules extracted from the neural network) implicity included in the process historical data can be used simultaneously. Therefore, a more suitable guidance can be provided. By doing this, the decision making of the operator during process operation can be supported more effectively.

In this embodiment, a water purification process is described. However, the present invention may be applied to various other processes and the same advantages can be obtained.

According to the present invention, by analyzing the combination status of the neural network after learning and calculating the relative causal relationship strength between input and output factors, only rules which are important for process operation, are acquired and the process operation is supported. By doing this, not only rules derived from the experience of the operator but also rules implicit in the process historical data can be used.

By doing this, a system which always provides the operator with suitable guidance can be constructed, the operation reliability is enhanced compared with the process operation performed by only one operator, and the burden imposed on the operator is reduced.

What is claimed is:

1. A system having a plurality of devices and a controller for controlling operations of said plurality of devices;

wherein said controller is arranged to control said plurality of devices according to a plurality of rules corresponding to inter-relationships of data items relating to the operations of said plurality of devices expressed by a neural network model having a hierarchical structure constructed of an input layer, at least one hidden layer and an output layer, said data items including output values as control variables to at least one of said plurality of devices and input values as state variables of at least a further one of said plurality of devices affecting on said output values, said controller comprising:

means for analyzing said data items to make evaluation indices obtained from weighing factors to inner combinations among output layer neurons, hidden layer neurons and input layer neurons of said neural network model;

means for calculating a summation of absolute values of said evaluation indices;.

means for normalizing each of said evaluation indices by said summation to obtain relative evaluation indices;

means for selecting pairs of said input and output values as to which of said relative evaluation indices satisfy a predetermined relationship with a predetermined threshold value;

means for deriving said plurality of rules corresponding to said inter-relationships between said selected input and output values; and means for controlling said plurality of devices based on said derived rules.

* * * * *